(12) United States Patent
Aiso

(10) Patent No.: US 7,869,064 B2
(45) Date of Patent: Jan. 11, 2011

(54) PRINTING DEVICE

(75) Inventor: Seiji Aiso, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1006 days.

(21) Appl. No.: 11/703,324

(22) Filed: Feb. 6, 2007

(65) Prior Publication Data

US 2007/0188787 A1 Aug. 16, 2007

(30) Foreign Application Priority Data

Feb. 7, 2006 (JP) .............................. 2006-029319

(51) Int. Cl.
G06F 15/00 (2006.01)
G06F 3/12 (2006.01)
G06K 1/00 (2006.01)
G06K 15/00 (2006.01)

(52) U.S. Cl. ..................................... 358/1.13; 358/1.18

(58) Field of Classification Search ................ 358/1.13, 358/1.14, 1.15, 1.18, 1.6, 1.1

See application file for complete search history.

(56) References Cited

U.S. PATENT DOCUMENTS

| 6,295,136 | B1 * | 9/2001 | Ono et al. .................. 358/1.15 |
| 7,639,879 | B2 * | 12/2009 | Goto et al. .................. 382/224 |
| 2004/0258304 | A1 | 12/2004 | Shiota et al. | |

FOREIGN PATENT DOCUMENTS

| JP | 04-170872 | 6/1992 |
| JP | 10-340332 | 12/1998 |
| JP | 11-321029 | 11/1999 |
| JP | 2002-010196 | 1/2002 |
| JP | 2004-236120 | 8/2004 |
| JP | 2005-301008 | 10/2005 |

OTHER PUBLICATIONS

Abstract of Japanese Patent Publication No. 2002-010196, Publication Date: Jan. 11, 2002, Patent Abstracts of Japan.
Abstract of Japanese Patent Publication No. 2004-236120, Publication Date: Aug. 19, 2004, Patent Abstracts of Japan.
Abstract of Japanese Patent Publication No. 04-17082, Publication Date: Jun. 18, 1982, Patent Abstracts of Japan.
Abstract of Japanese Patent Publication No. 10-340332, Publication Date: Dec. 22, 1998, Patent Abstracts of Japan.
Abstract of Japanese Patent Publication No. 11-321029, Publication Date: Nov. 24, 1999, Patent Abstracts of Japan.
Abstract of Japanese Patent Publication No. 2005-301008, Publication Date: Oct. 27, 2005, Patent Abstracts of Japan.

* cited by examiner

*Primary Examiner*—Douglas Q Tran
(74) *Attorney, Agent, or Firm*—Martine Penilla & Gencarella, LLP

(57) ABSTRACT

A printing device comprises an evaluation value determining module, a grouping process module, a recommended image designating module, and a printing process module. The evaluation value determining module determines, for each image, a first evaluation value for a prescribed evaluation item. The grouping process module performs a sorting process to sort the plurality of images into groups of similar images. The recommended image designating module designates, for each group, a recommended image from among the images belonging to the group, based on the first evaluation value. The printing process module prints the designated recommended image.

18 Claims, 11 Drawing Sheets

US 7,869,064 B2

PRINTING DEVICE

CROSS REFERENCE TO RELATED APPLICATIONS

The present application claims the priority based on Japanese Patent Application No. 2006-29319 filed on Feb. 7, 2006, the disclosure of which is hereby incorporated by reference in its entirety.

BACKGROUND OF THE INVENTION

1. Field of the Invention

The present invention relates to a technology for classifying a plurality of images into groups of similar images, and for printing a recommended image of each group.

2. Description of the Related Art

In recent years, high-capacity memory cards have become widespread as memory media for digital cameras and mobile phones. Since such high-capacity memory cards can store large numbers of images, it is sometimes difficult for the use to retrieve a desired image from among the large number of stored images. Accordingly, there has been proposed a printing device able to extract and print an image desired by the user, from among a large number images stored on a memory card (see JP2005-301008A).

The printing device disclosed in JP2005-301008A is adapted to extracting images shot of people from among images stored on a memory card; displaying the images on a display; and when the user has selected a desired image while viewing images displayed on the display, printing the selected image.

Owing to the ease with which large numbers of images can be stored on a memory card, there are instances in which a user will shoot a number of shots of the same subject, and of the same composition. In such cases, where the subject is person for example, a number of similar images of the person, each taken with the same composition, may be stored on the memory card.

With the printing device disclosed in JP2005-301008A, if a large number of similar images of the same person are stored on a memory card in this way, all of the considerable number of images will be displayed on the display. Consequently, the user will have to select a desired image worth printing from among this large number of similar images, which is extremely laborious.

Moreover, with the printing device disclosed in JP2005-301008A, it is necessary to determine, for each image stored on the memory card, whether a human subject appears in the image; and once this determination has been made for all of the images, to then display those images in which human subjects have been determined to appear.

Since the determination as to whether a human subject appears is accomplished through analyzing the image data of each individual image, it takes a relatively long time to complete the determination process for all of the images, and a resultant problem is that it takes a relatively long time for printing of a preferred image (an image in which a human subject appears) to be completed.

The problems mentioned above are not exclusive to cases where memory cards are used, but are common generally to instances where only a preferred image is to be selected for printing from among a plurality of images.

SUMMARY OF THE INVENTION

An object of the present invention is to provide a technology affording an easy process for selecting and printing only a desired image from among a plurality of images.

According to one aspect of the present invention, there is provided a printing device comprising an evaluation value determining module, a grouping process module, a recommended image designating module, and a printing process module. The evaluation value determining module determines, for each image, a first evaluation value for a prescribed evaluation item. The grouping process module performs a sorting process to sort the plurality of images into groups of similar images. The recommended image designating module designates, for each group, a recommended image from among the images belonging to the group, based on the first evaluation value. The printing process module prints the designated recommended image.

Since the printing device classifies a plurality of images into groups of similar images, and based on a first evaluation value for a prescribed evaluation item, designates and prints a recommended image for each group, thereby affording an easy process for selecting and printing only a desired image from among a plurality of similar images.

The present invention may be reduced to practice in various forms, for example, a recommended image printing method and printing device; a computer program for accomplishing the functions of such a method or device; a recording medium having such a computer program recorded thereon; or a data signal containing such a computer program and embodied in a carrier wave.

These and other objects, features, aspects, and advantages of the present invention will become more apparent from the following detailed description of the preferred embodiments with the accompanying drawings.

DESCRIPTION OF THE PREFERRED EMBODIMENT

The preferred embodiments for carrying out the invention will be described hereinbelow, in the following order.

A. Embodiment 1
B. Embodiment 2
C. Embodiment 3
D. Blurred Focus Assessment Process
E. Modified Examples

A. Embodiment 1

A1. General Configuration of Printer

Figure 1:
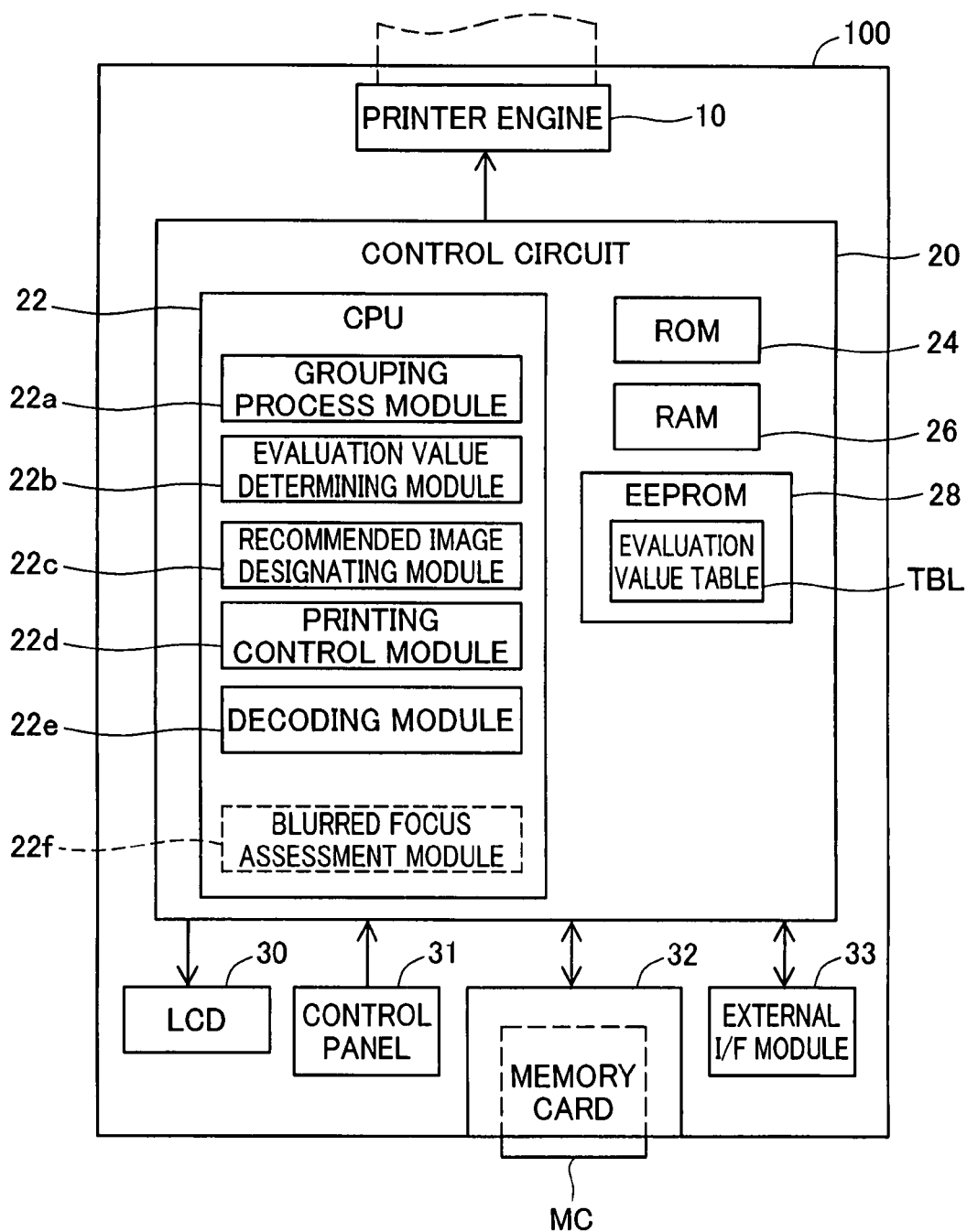
FIG. 1 illustrates the general configuration of a printer as a first embodiment of the present invention.

FIG. 1 is an illustration of the general configuration of a printer as a first embodiment of the present invention. The printer 100 is equipped with a control circuit 20; a printer engine 10 connected to the control circuit 20; a liquid crystal display 30; a control panel 31; a memory card slot 32; and an external interface 33.

The printer engine 10 is furnished with a carriage (not shown) having ink cartridges, not shown, installed thereon, and a motor for driving the carriage (not shown). The printer engine 10 is the functional portion that actually executes printing. The liquid crystal display 30 is a functional portion for displaying menus of various kinds. The control panel 31 is furnished with control buttons (not shown) allowing the user to make various settings. The memory card slot 32 is a functional portion for reading data from an inserted memory card. The external interface 33 is an interface for connecting a digital still camera, computer, or other device to the printer 100 via a cable.

The control circuit 20 is furnished with a CPU 22, a ROM 24, a RAM 26, and an EEPROM 28. The ROM 24 stores a control program for overall control of the operation of the printer 100. The EEPROM 28 stores an evaluation value table TBL, which will be discussed later.

The CPU 22 executes the control program stored in the ROM 24 in order to function as a grouping process module 22a, an evaluation value determining module 22b, a recommended image designating module 22c, a printing control module 22d, and a decoding module 22e. A blurred focus assessment module 22f, shown by broken lines, will be discussed in Embodiment 2.

The printing control module 22d is a functional portion for displaying various menu screens on the liquid crystal display 30, and for reading data from a memory card inserted into the memory card slot 32, from a device connected via the external interface 33, and so on. The printing control module 22d also has the function of controlling the printer engine 10 and executing printing based on the printer paper size specified through the control panel, and the loaded image data.

The decoding module 22e is a functional portion employed where image data being read from a memory card or other medium has been compressed by a compression format such as the JPEG (Joint Photographic Experts Group) format, and is used to expand the data to the original image. The grouping process module 22a, the evaluation value determining module 22b, and the recommended image designating module 22c will be discussed in detail later.

In the printer 100 having the above configuration, by means of executing the recommended image printing process, a plurality of images stored on a memory card or other medium are sorted into groups of similar images, and a recommended image that is evaluated highly is selected for printing from among each of the groups.

The grouping process module 22a is a functional portion for sorting a plurality of images into groups of similar images; the evaluation value determining module 22b is a functional portion for specifying an evaluation value for each image; and the recommended image designating module 22c is a functional portion for selecting a recommended image of each group.

A2. Overview of Recommended Image Printing Process

Figure 2:
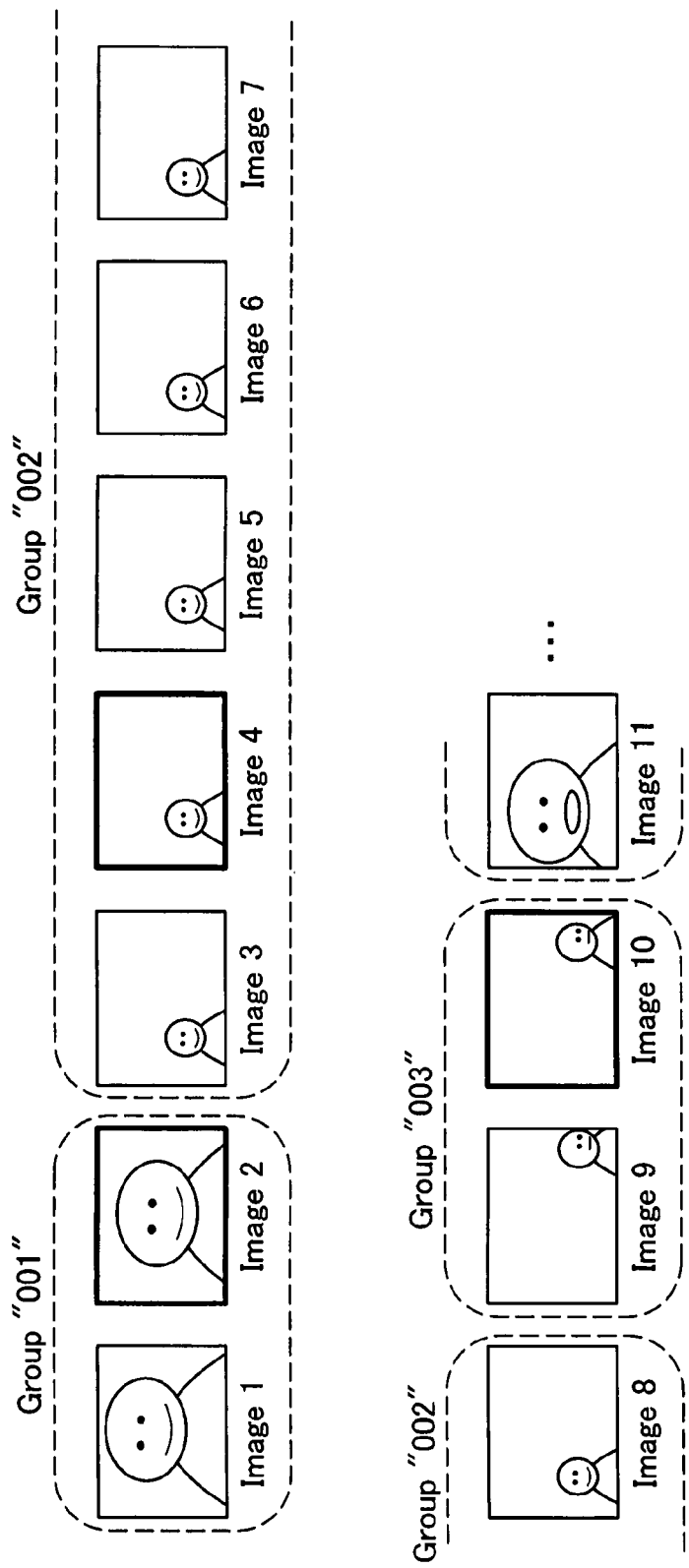
FIG. 2 schematically illustrates selection of a recommended image by means of the recommended image printing process in Embodiment 1.

FIG. 2 schematically illustrates selection of a recommended image by means of the recommended image printing process in Embodiment 1. In FIG. 2, a plurality of images stored on a memory card or other medium are arranged sequentially according to shooting time. For convenience, these images are designated as "Image 1," "Image 2," "Image 3" . . . in order of shooting time. Images bordered by thick lines represent recommended images.

Where a number of images of similar composition have been taken of the same subject, a large number of images with shooting times that are relatively close together will be obtained. Consequently, where such a plurality of images are arranged in series according to shooting time, similar images become arranged in a series like that depicted in FIG. 2. In the recommended image printing process, the plurality of images stored on the memory card etc. are arranged in series according to shooting time, and for each image proceeding in order from that with the earliest shooting time, it is determined whether the image is similar to the one immediately preceding. Where images are similar, the image selected for processing is sorted into the group to which the immediately preceding image belongs, whereas if images are not similar, the image selected for processing is sorted into a new group.

As a specific example, when after Image 1 shown in FIG. 2 has been sorted into the group "001," Image 2 has now been determined to be similar to Image 1 immediately preceding it, Image 2 will be assigned to the group "001" to which Image 1 belongs. As another example, where Image 3 has been determined not to be similar to Image 2 immediately preceding it, Image 3 will be assigned to a new group, rather than the group "001" to which Image 2 belongs. By sorting images in this way, by the point in time that an image is sorted into a new group, all images of a group to which the image immediately preceding belongs will have been determined.

Each image is subject to calculation of an evaluation value for use in determining a recommended image. At the point in time that the images of a single group have been determined in the manner described previously, the image having the highest evaluation value will be selected as the recommended image.

As a specific example, when Image 3 is sorted into the new group "002" in the manner described above, the two images Image 1 and Image 2 will be designated as images belonging to the group "001." The evaluation values of Images 1 and 2 are then compared, and in the event that the evaluation value of Image 1 is higher than the evaluation value of Image 2, Image 2 will be selected as the recommended image for the group "001." Once Image 2 has been selected as the recommended image for the group "001," while performing the printing process for this Image 2, sequential sorting of Image 4, Image 5, . . . into groups is carried out as described above. As a result, the images of the groups "001," "002," "003," . . . are sequentially determined, and the recommended image of each group is printed out as shown in FIG. 2.

A3. Detailed Procedure of Recommended Image Printing Process

The recommended image printing process of the present embodiment here assumes that a memory card MC has been inserted into the memory card slot 32 as depicted in FIG. 1. A number of sets of image data of similar images shot with a digital still camera are stored on the memory card MC.

These image data sets are all stored as Exif (Exchangeable Image File Format) data, and include image data of original images compressed in JPEF format and image data of thumbnail images corresponding to the original images. As in FIG. 2, the images represented by these sets of image data are denoted in order of shooting time as Image 1, Image 2, Image 3 . . . . The file names of these sets of image data are respectively named "image1.jpg," "image2.jpg," "image2.jpg," . . . . Original images may be also referred to as "non-reduced images" or "full size images," and thumbnail images as "reduced images."

Under the assumption mentioned above, with the menu screen (not shown) displayed on the liquid crystal display 30, once the user operates the control panel 31 and selects a "Recommended Image Print Menu," selects the memory card MC as the image source, and selects a printer paper size, the recommended image printing process will be executed.

Figure 3:
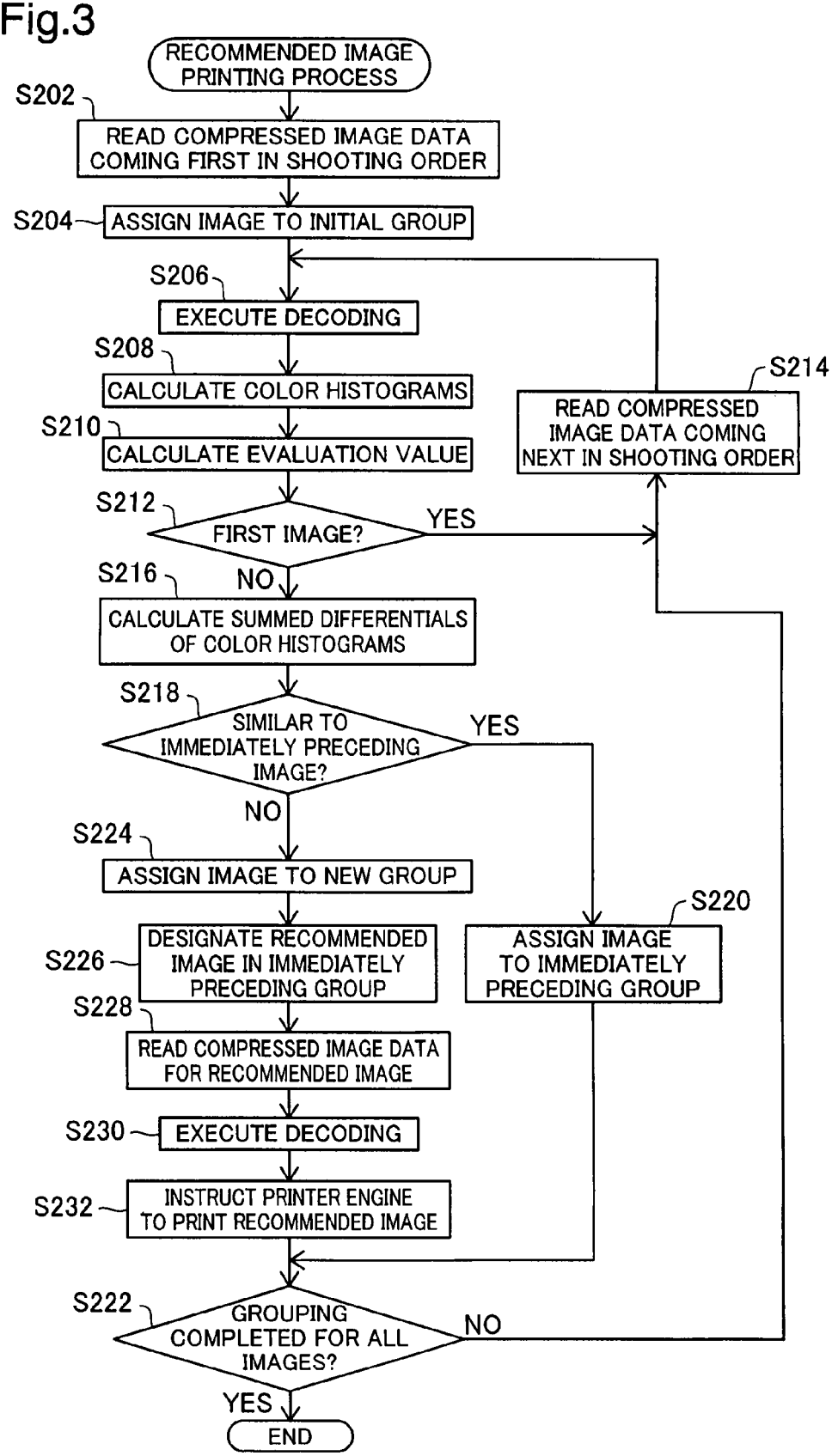
FIG. 3 is a flowchart depicting the procedure of the recommended image printing process in Embodiment 1.

FIG. 3 is a flowchart depicting the procedure of the recommended image printing process in Embodiment 1. When the recommended image printing process shown in FIG. 3 is initiated, the printing control module 22*d* shown in FIG. 1 reads out from the image data stored on the selected memory card MC the compressed image data of the original image contained in the image data with the earliest shooting time (i.e. "image1.jpg"), and stores the data in RAM 26 in Step S202.

Next, the grouping process module 22*a* sorts the image with the earliest shooting time "Image 1" into the initial group "001."

Next, the decoding module 22*e* decompresses the compressed image data which has been read out, and stores the decompressed image data of the original image obtained thereby (hereinafter termed "original image data for processing") in the RAM 26 in Step S206. Next, the grouping process module 22*a* derives a histogram of each of the colors R (red), G (green), and B (blue) for the original image data for processing, and stores the histogram in the RAM 26 in Step S208. Next, on the basis of the original image data for processing, the evaluation value determining module 22*b* derives an evaluation value or a value of a prescribed evaluation index, and stores it in the RAM 26 in Step S210. The present embodiment employs as the evaluation value an evaluation value that specifies the quality of composition of the image, and the quality of composition with respect to human subjects in particular, as the evaluation item.

The procedure for deriving the evaluation value will now be described briefly. First, the evaluation value determining module 22*b* analyzes the original image data for processing, and detects the size and location of any human face included in the image. Detection of the size and location of the face may be accomplished, for example, by extracting an area containing pixels of skin tone from the image data, and then pattern-matching the area with a prescribed template representing facial shape. Next, the evaluation value determining module 22*b* loads the evaluation value table TBL from the EEPROM 28, checks the size and position of the detected face against the loaded evaluation value table TBL, and derives an evaluation value.

Figure 4:
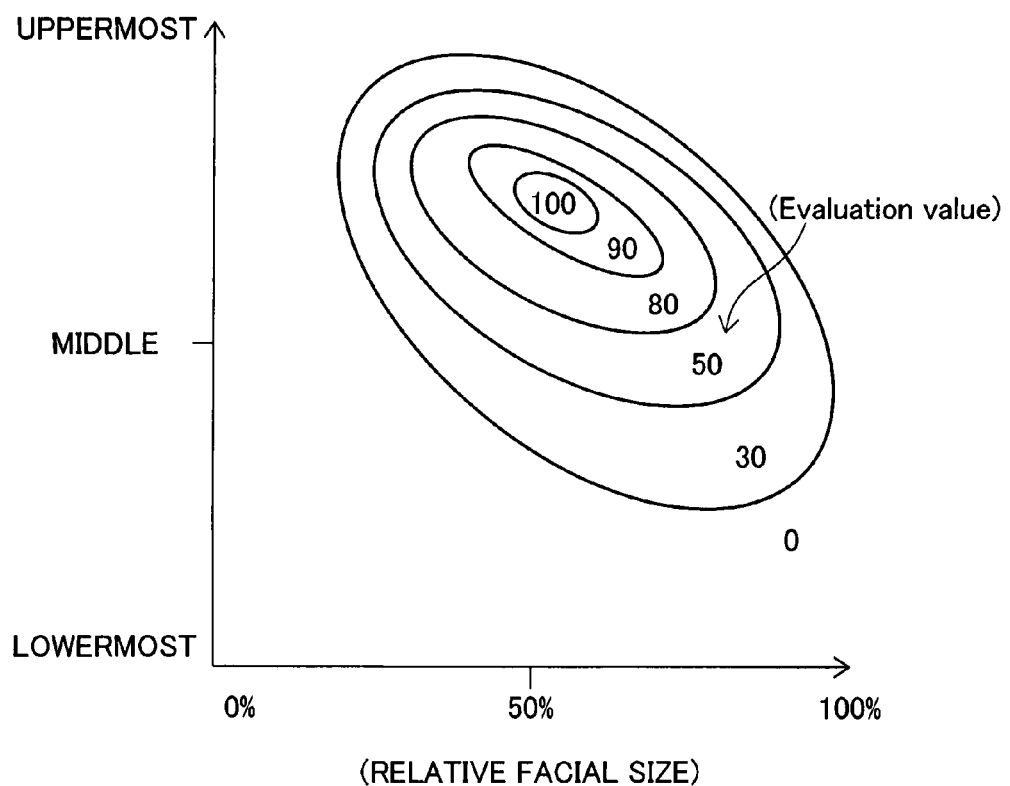
FIG. 4 schematically illustrates the evaluation value table TBL stored in the EEPROM.

FIG. 4 schematically illustrates the evaluation value table TBL stored in the EEPROM 28. This evaluation value table TBL defines evaluation values in terms of relative facial size (the horizontal axis) and relative facial position (vertical axis). Here, "relative facial size" refers to the length of the face as a proportion of the length of the image; and "relative facial position" refers to the position of the center location of the face in the vertical direction of the image. From the size and position of the face detected in the above manner, the evaluation value determining module 22*b* derives the "relative facial size" and the "relative facial position," and using the evaluation value table TBL, determines the evaluation value.

Referring back to FIG. 3, the grouping process module 22*a* now decides whether the image selected for processing is the first image in Step S212. In the event that the image selected for processing is the first image, the printing control module 22*d* reads out the compressed image data of the original image contained in the next set of image data "image2.jpg" and stores it in the RAM 26 in Step S214.

Next, with this Image 2 as the image selected for processing, the process of Steps S206-S212 described earlier is carried out. In this case, since the Image 2 selected for processing is the second image, the process advances from Step S212 to Step S216.

The grouping process module 22*a* then reads out the color histogram of the image selected for processing (Image 2) and the color histogram of the immediately preceding image (Image 1) from the RAM 26, and calculate summed differentials of these color histograms in Step S216.

Figure 5:
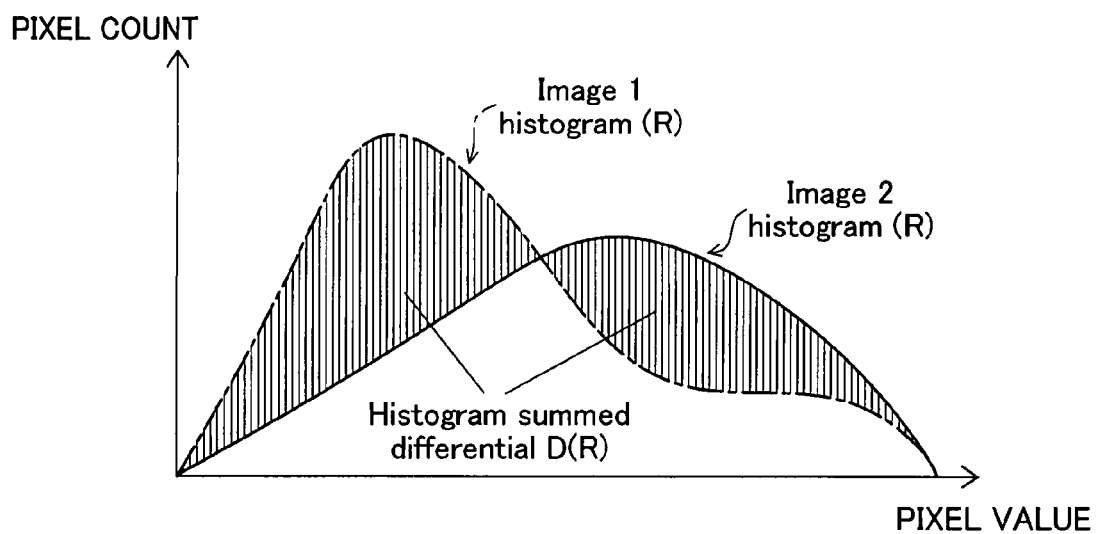
FIG. 5 schematically illustrates the method of calculating summed differentials of color histograms.

FIG. 5 schematically illustrates the method of calculating summed differentials of color histograms. In FIG. 5, pixel value is plotted on the horizontal axis and pixel count on the vertical axis, respectively. The solid line represents the histogram for red in Image 2, and the dot-and-dash line represents the histogram for red in Image 1, respectively. The summed differential for red D(R) corresponds to the areas bounded by the solid line and the dot-and-dash line. The grouping process module 22*a* derives the summed differential for red D(R) by integrating the absolute value of the pixel count differential at each pixel value. The grouping process module 22*a* calculates summed differentials of the histograms for green and blue, in the same manner.

Once the summed differentials of the color histograms have been derived in this way, then on the basis of the summed differentials of the color histograms so derived, the grouping process module 22*a*, decides whether the image selected for processing is similar to the image immediately preceding it in Step S218. Specifically, threshold values are established in advance for the summed differentials of the histograms of each color (R, G, B), and the grouping process module 22*a* decides whether the summed differentials of the colors are each less than the corresponding threshold value. If the grouping process module 22*a* decides that the summed differentials are each less than the corresponding threshold value, the image selected for processing will be determined to be similar to the image immediately preceding it; and if at least one of the summed differentials of the colors is equal to or greater than the corresponding threshold value, the image selected for processing will be determined to be not similar to the image immediately preceding it.

As shown in FIG. 2, where it has been decided that the image selected for processing (Image 2) is similar to the image immediately preceding it (Image 1) in Step S218, the grouping process module 22*a* sorts the image selected for processing into the group to which the image immediately preceding belongs (hereinafter termed the "immediately preceding group").

Next, the grouping process module 22*a* decides whether grouping has been completed for all images in Step S222. In the event that, as discussed above, the image selected for processing is Image 2, and there are still images remaining that have not been sorted into groups, the process returns to Step S214, the next image "Image 3" will be selected as the image for processing, and the process of Steps S214-S218 discussed above will be executed.

Then, as shown in FIG. 2, if in the process of Step S218 it has been decided that the image selected for processing "Image 3" is not similar to the image immediately preceding it, or "Image 2", the grouping process module 22a will sort the image selected for processing "Image 3" into a new group in Step S224.

In the event that a new group is created, the grouping process module 22a designates a recommended image for the immediately preceding group, on the basis of the evaluation value of each image in Step S226. In the example of FIG. 2, where Image 3 has been assigned to the new group "002," Image 1 and Image 2 belonging to the immediately preceding group "001" are compared; and Image 2, which has the highest evaluation value, is designated as the recommended image of the group "001."

Once the recommended image has been designated, the recommended image designating module 22c issues to the printing control module 22d a print command instructing it to initiate the printing process of the recommended image. In response to this print instruction, the printing control module 22d reads the compressed image data for the original image of the recommended image from the memory card MC into the RAM 26 in Step S228; whereupon the decoding module 22e decodes or decompresses the compressed image data and stores the decompressed image data of the original image in the RAM 26 in Step S230. Next, the printing control module 22d instructs the printer engine 10 to print on the basis of this image data in Step S232. As a result, where Image 2 has been designated as the recommended image of the group "001" in the manner described previously, this Image 2 will be printed by the printer engine 10.

After the recommended image for the group "001" has been designated and the instruction to print the recommended image has been transferred to the printer engine 10, the grouping process module 22a performs the process of Step S222 mentioned previously, and decides whether grouping has been completed for all images; in the event that there are any remaining images, the process of Steps S214-S232 described previously will be executed for the next image selected for processing. By successively sorting images into groups of similar images in this way, each time that the back end of one group is determined, a recommended image for the group will be designated and printed out.

As described above, in the recommended image printing process of the present embodiment, a plurality of images stored on a memory card MC are sorted into groups of similar images; and from each group the image having the highest evaluation value is designated as the recommended image and is printed out. Consequently, a large number of images can be grouped automatically into groups of similar images, and a recommended image can be selected automatically from each group.

In instances where several shots of similar composition have been taken of the same subject, a large number of similar images that are relatively close together in shooting time will be obtained. Accordingly, by determining, in order according to shooting time, whether each image is similar to the image immediately preceding it, in the event that an image is determined not to be similar to the image immediately preceding it, the image immediately preceding can be designated as the final image belonging to the immediately preceding group. It is therefore possible to designate a recommended image for the immediately preceding group before all the images are read out from the memory card MC. Moreover, selection of images belonging to the next new group will be carried out in parallel with printing of the recommended image. As a result, it is possible, for example, to reduce the time required to complete printing of all of the recommended images, as compared to the case of a sequential process whereby a recommended image for each group is selected and the selected recommended image is printed, only after all of the images have been sorted into groups.

B. Embodiment 2

In Embodiment 1 discussed previously, designation of the recommended image within a group is made on the basis of an evaluation value indicating the quality of composition. However, this leaves a risk of selecting as the recommended image a flawed image that, while having good composition, has blurred focus. Therefore, in the present embodiment, a blurred focus assessment process, to be discussed later, is carried out to designate images free from blurred focus as the recommended images. Additionally, the grouping process is accelerated by utilizing thumbnail images for executing the process.

Figure 6:
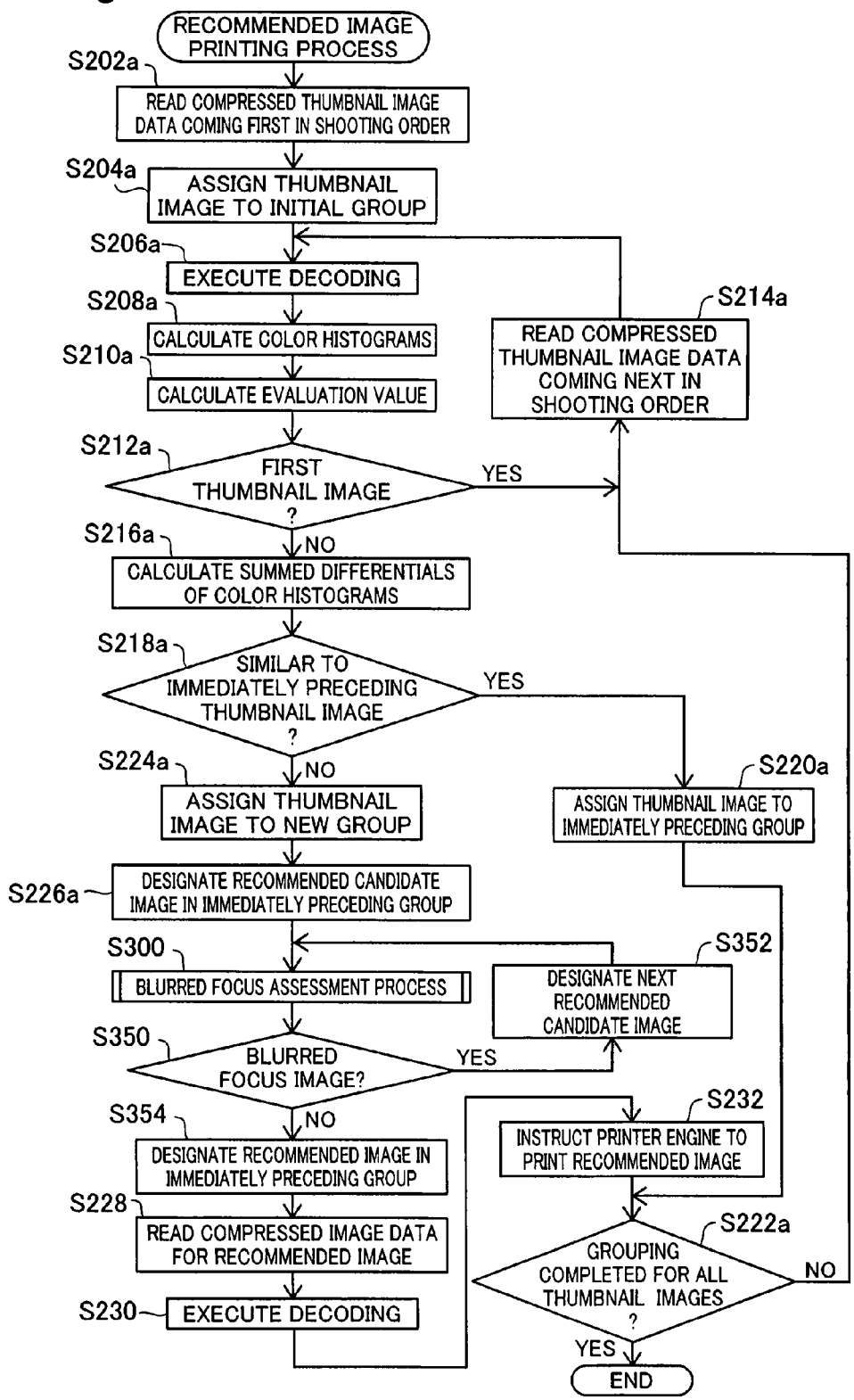
FIG. 6 is a flowchart depicting the procedure of the recommended image printing process in Embodiment 2.

FIG. 6 is a flowchart depicting the procedure of the recommended image printing process in Embodiment 2. The procedure of FIG. 6 is the same as the procedure of FIG. 3 except that the content of Steps S202-226 of FIG. 3 has been modified, and Steps S300, S350, S352, and S354 have been added between Step S226 and Step S228. Steps S202a-224a of FIG. 6 differ from Steps S202-224 of FIG. 3 only in that the images selected for processing are thumbnail images instead of original images, and thus will not be discussed in detail.

In Embodiment 2, thumbnail images are used in designating a recommended image in Step S226a. However, in contrast to Step S226 of Embodiment 1, at this point in time, tentative designation is made in terms of a recommended candidate image, rather than immediately designating a recommended image.

Next, the blurred focus assessment module 22f, selecting for processing the recommended candidate image, carries out a blurred focus assessment process in Step S300, to be discussed later. While the details of the process will be discussed later, in the blurred focus assessment process, the compressed image data of the original image of the recommended candidate image is read out from the memory card MC, and an assessment is made as to whether the original image is an image with blurred focus.

If by means of this blurred focus assessment process the image is assessed as having blurred focus in Step S350, the grouping process module 22a will then designate the image having the next highest evaluation value, rather than the recommended candidate image designated previously, as the new recommended candidate image in Step S352. For example, in the event that Image 2, which was previously designated as the recommended candidate image in group "001," has been assessed as being an image with blurred focus, Image 1 will now be designated as the recommended candidate image. Once the new recommended candidate image has been designated in this way, the blurred focus assessment process in Step S300 is executed again, targeting the new recommended candidate image "Image 1". If on the other hand in the process of Step S350 the recommended candidate image is not assessed as being an image with blurred focus, the grouping process module 22a will designate the recommended candidate image at this time as the recommended image for the immediately preceding group in Step S354. In the event that all of the recommended image of the immediately preceding group have blurred focus, the image having the highest evaluation value may be designated as the recommended image for the immediately preceding group. Once a recommended image has been designated in this manner, the process of Steps S228-232 is executed in the same manner as in Embodiment 1, and the designated recommended image is printed out.

In Embodiment 2 discussed above, determination of similarity and designation of recommended candidate images are carried out using thumbnail images instead of original images. Since thumbnail images contain less data than original images, these determinations and designations will be made in a relatively short time.

In the second embodiment, the assessment as to whether an image has blurred focus are made sequentially starting with that having the highest evaluation value, and an image determined to not be an image with blurred focus is designated as the recommended image. It is accordingly possible to prevent an image with blurred focus from being printed.

Since the blurred focus assessment process is carried out using image data for the original images containing relatively large amounts of data, the process takes a relatively long time. However, as noted, since the blurred focus assessment process is carried out only for recommended candidate images, the process will be completed in a shorter time, as compared to the case where the blurred focus assessment process is carried out for all images.

C. Embodiment 3

Figure 7:
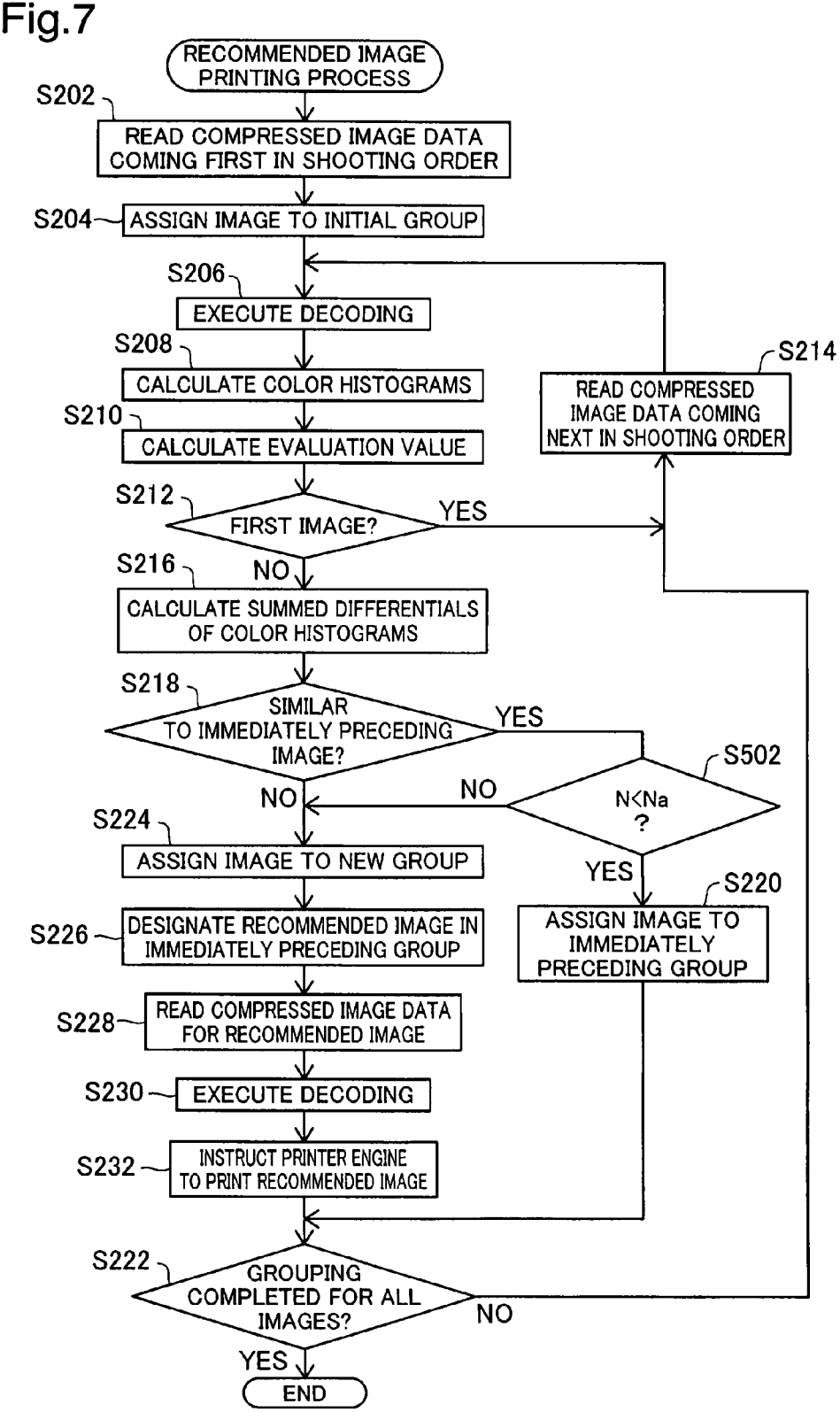
FIG. 7 is a flowchart depicting the recommended image printing process of Embodiment 3.

FIG. 7 is a flowchart depicting the recommended image printing process of Embodiment 3. The procedure of FIG. 7 is the same as the procedure of FIG. 3 except that Step S502 has been added between Step S218 and Step S220.

In Step S218, in the event that an image selected for processing is determined to be similar to the immediately preceding image, unlike Embodiment 1, the grouping process module 22a will then further determine whether the number N of images belonging to the immediately preceding group is less than a threshold value Na, where N is an integer equal to or greater than 2. Here, the "number N of images belonging to the immediately preceding group" is not considered to include the image currently selected for processing, and refers to the number of images assigned to the immediately preceding group up to that point in time. In the present embodiment, the threshold value Na is assumed to be "5," but could be set to any integer equal to or greater than 2.

Then, in the event that the grouping process module 22a determines that the image number N is smaller than Na in Step S502, it will assign the image currently selected for processing to the immediately preceding group in Step S220; whereas in the event that the image number N is equal to or greater than Na in Step S502, it will assign the image selected for processing to a new group in Step S224.

By so doing, even if the image currently selected for processing is similar to the image immediately preceding it, the image selected for processing will be assigned to a new group if the number of images belonging to the immediately preceding group is equal to or greater than Na. Then, once the image selected for processing has been assigned to a new group, a recommended image for the immediately preceding group is designated and printed out in the same manner as in Embodiment 1.

Figure 8:
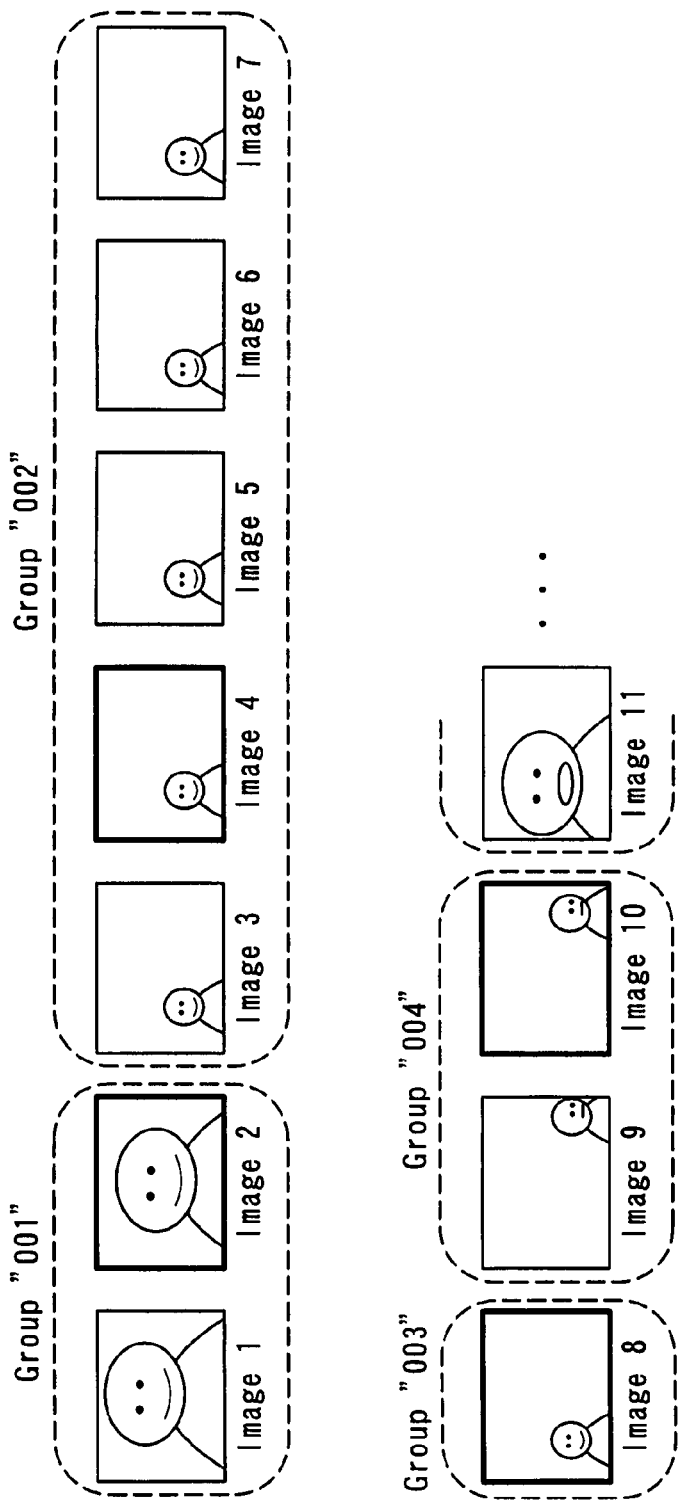
FIG. 8 schematically illustrates selection of a recommended image by means of the recommended image printing process of Embodiment 3.

FIG. 8 schematically illustrates selection of a recommended image by means of the recommended image printing process of Embodiment 3. The images shown in FIG. 8 is identical to those shown in FIG. 2.

As shown in FIG. 2, in Embodiment 1, the six similar images Image 3 to Image 8 belong to a single group "002." In the present embodiment, Image 3 to Image 8 are divided into two groups, i.e. Image 3 to Image 7 belong to group "002," and Image 8 to group "003," as shown in FIG. 8.

More specifically, where Image 8 is the image selected for processing, if as a result of the process of Step S218 it is decided that Image 8 is similar to Image 7 immediately preceding it, since the number N of images belonging to group "002" is equal to or greater than the threshold value Na (=5), Image 8 will be assigned to the new group "003." As a result, since the similar Images 3-8 are divided among the two groups "001" and "002," one recommended image will be designated and printed from each of the groups "001" and "002." Consequently, a total of two images from the similar Images 3-8 will be designated as recommended images and printed.

In Embodiment 3, in the event that the image selected for processing is determined to be similar to the image immediately preceding it, it is determined whether the number N of images belonging to the immediately preceding group is equal to or greater than the prescribed threshold value Na, and if its result is positive, the image selected for processing will not be assigned to the immediately preceding group, but rather to a new group. Consequently, the number N of images belonging to any one group is Na at most.

Therefore, where similar images of a number equal to Na+1 or greater have been stored on the memory card MC, these sets of similar images will be sorted into two or more groups, and one recommended image will be printed from each group, whereby recommended images in a number equal to the number of groups will be printed from these sets of similar images. As a result, more recommended images can be printed when a set of similar images contains a larger number of images, thereby accommodating the user's desire to print more recommended images in the case where a large number of similar images have been shot, as compared to where a fewer number of similar images have been shot.

D. Blurred Focus Assessment Process

Figure 9:
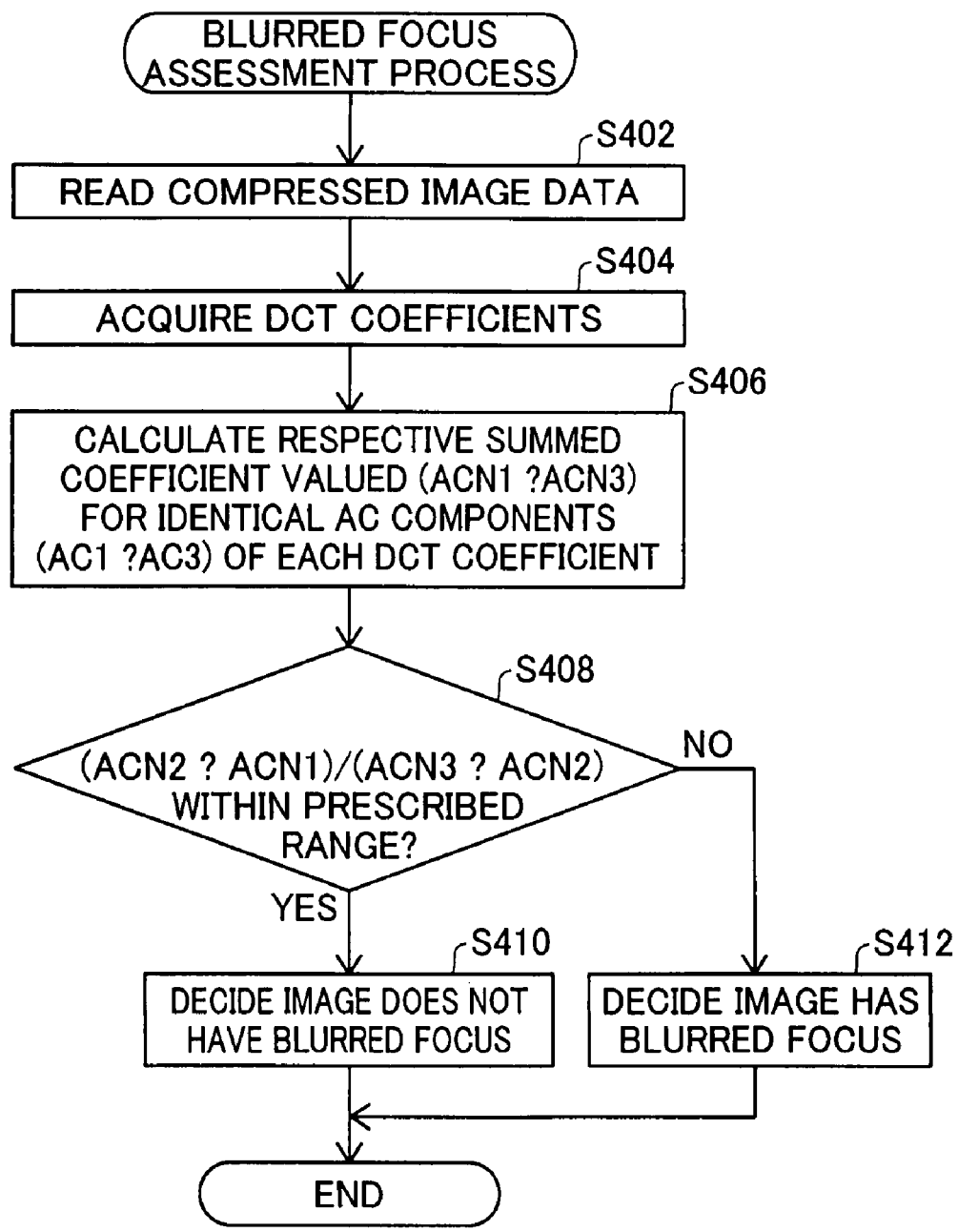
FIG. 9 is a flowchart depicting the procedure of the blurred focus assessment process executed in Step S300.

FIG. 9 is a flowchart depicting the procedure of the blurred focus assessment process executed in Step S300 of FIG. 6. When the blurred focus assessment process is initiated, the printing control module 22d shown in FIG. 1 reads the image data of the compressed original image from the memory card MC, and places it into the RAM 26 in Step S402. Next, the blurred focus assessment module 22f reads the image data from the RAM 265; performs entropy decoding and dequantization which are parts of the commonly known procedure for decompressing images compressed in the JPEG format; and acquires a discrete cosine transform (DCT) coefficient for each image block in Step S404. Next, the blurred focus assessment module 22f integrates for all blocks the absolute value of DCT coefficients of prescribed low-frequency AC components in Step S406.

Figure 10:
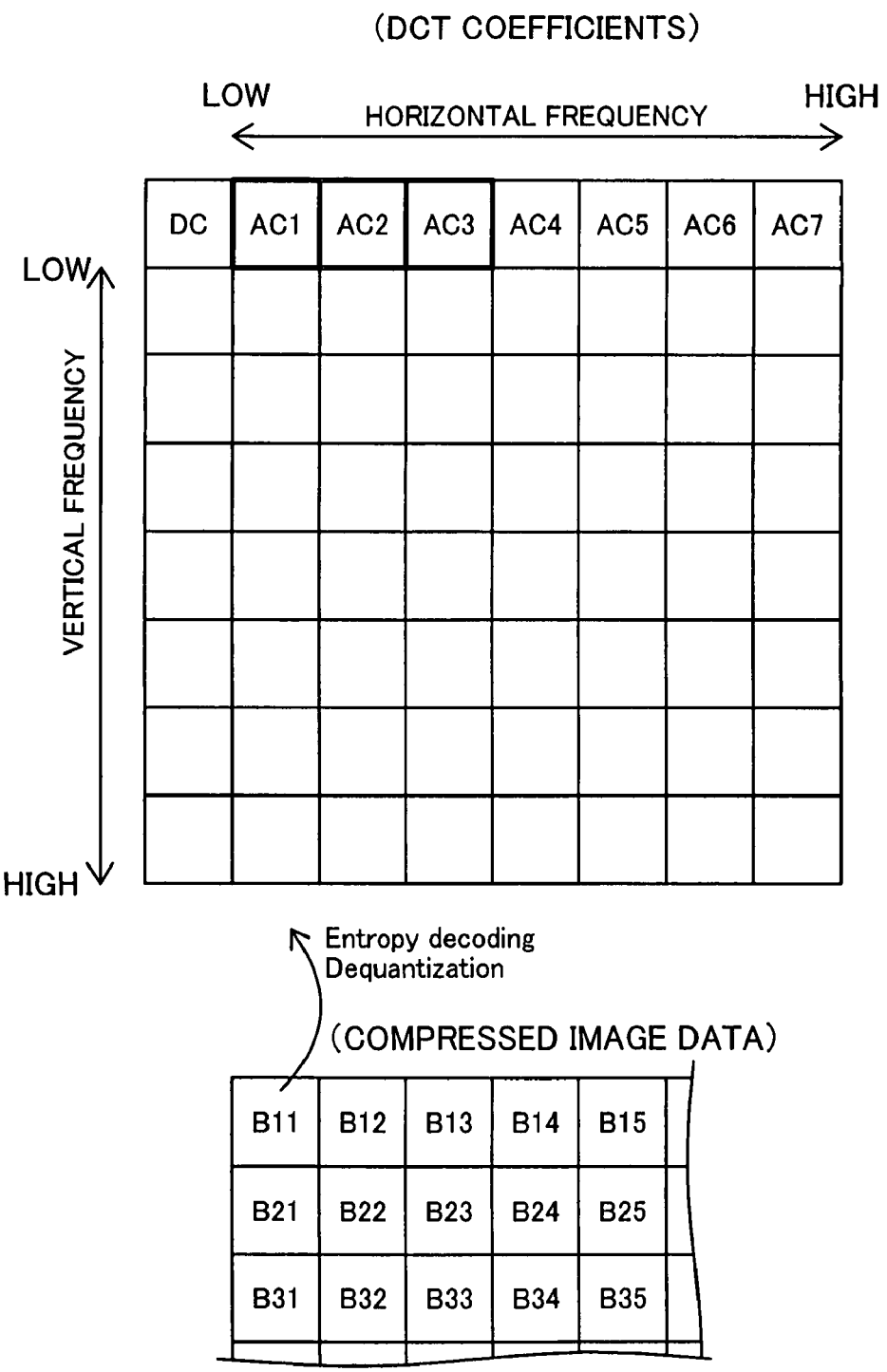
FIG. 10 schematically illustrates the DCT coefficients obtained in the process of Step S404.

FIG. 10 schematically illustrates DCT coefficients obtained in the process of Step S404. In FIG. 10, some of the compressed image data is shown at bottom, and DCT coefficients derived on the basis of the initial block B11 are shown at top.

As shown at bottom in FIG. 10, where compressed image data is composed of blocks B11, B12, B13 . . . , the result of the process of Step S404 will be 8×8 DCT coefficients for Block B11, as shown at top in FIG. 10. Here, the AC components having horizontal components only are denoted as AC1, AC2, AC3, . . . AC7.

The blurred focus assessment module 22f then calculates the sum of the absolute values of the DCT coefficients AC1 derived for the blocks B11, B12, B13 . . . (hereinafter termed "summed coefficient value ACN1"). The sum of the absolute values of the DCT coefficients AC2 (hereinafter termed "summed coefficient value ACN2") and the sum of the absolute values of the DCT coefficients AC3 (hereinafter termed "summed coefficient value ACN3") are calculated in the same way.

Referring back to FIG. 9, on the basis of the values of the summed coefficient values ACN1, ACN2, ACN3 it has calculated, the blurred focus assessment module 22f then decides whether a value F derived by Eq. (1) below lies within a prescribed numerical range in Step S408.

$$F=(ACN2-ACN1)/(ACN3-ACN2) \quad (1)$$

Then, if the blurred focus assessment module 22f determines that the value F lies within the prescribed numerical range, it decides that the image selected for processing is not an image having blurred focus in Step S410, or if determined that the value F does not lie within the range, that the image has blurred focus in Step S412.

Figure 11:
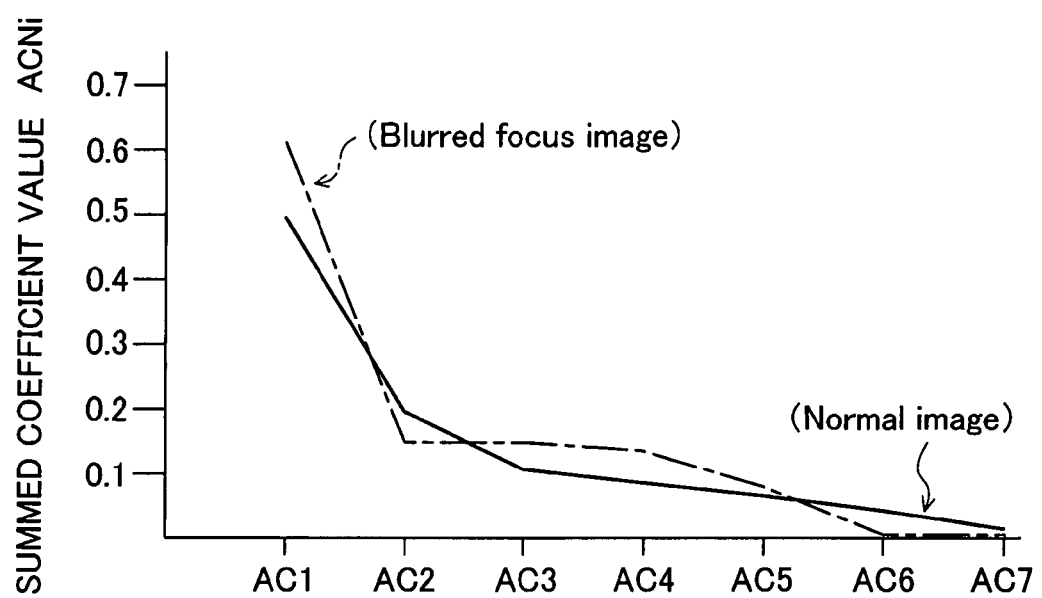
FIG. 11 is a graph of summed coefficient values for the frequency components.

The value F and prescribed numerical range mentioned above will now be discussed with reference to FIG. 11. FIG. 11 is a graph of summed coefficient values for the frequency components. In FIG. 11, the horizontal frequency components are shown plotted on the horizontal axis, and summed coefficient values ACNi of DCT coefficients for the blocks are shown plotted on the vertical axis, respectively. An example graph of an image having blurred focus is shown by the dot-and-dash line, and an example graph of a normal image without blurred focus is shown by the solid line.

Of the graphs shown in FIG. 11, focusing on the segments of components AC1-AC3, while the difference between ACN1 and ACN2 is greater in the image with blurred focus than in the normal non-blurred image, the difference between ACN2 and ACN3 is smaller in the image with blurred focus than in the normal image. The inventors have discovered that this tendency is observed between a majority of images with blurred focus and normal images.

Therefore, where an image has blurred focus, the value F derived with Eq. (1) given above will assume a larger value than when an image is normal. Accordingly, an appropriate threshold value of F is empirically determined for images in which a human subject appears out of focus, and if the calculated value F for an arbitrary image according to Eq. (1) is greater than the threshold value, the image will be determined as having blurred focus.

Experiments have shown that images with blurred focus sometimes make ACN3 greater than ACN2, which is not so with normal non-blurred images. In such cases, the F value according to Eq. (1) will give a negative value. Consequently, an image may be determined to have blurred focus even in instances where the calculated value F is a negative value.

Experiments have also shown that even where ACN2 and ACN3 have substantially the same value, blurred focus will be noticeable in some instances; accordingly, the prescribed numerical range may be established such that, for example, 1.2<F<5.2, and such that in no event the lower limit value is equal to "0."

In the example discussed above, AC components AC1-AC3 having horizontal components only were used, but it would be possible to instead use AC components having vertical components only. It is also possible to make similar determination using other AC components.

E. Modified Examples

The invention is not limited to the embodiments described hereinabove, and may be reduced to practice in various forms without departing from the spirit thereof. Modified examples such as the following are possible, for example.

E1. Modified Example 1

In Embodiment 2 discussed above, a recommended candidate image is first designated by means of an evaluation value based on quality of composition, then it is decided whether the recommended candidate image is an image with blurred focus, and a recommended image is designated. In another procedure, it is possible instead, for each image, to calculate another evaluation value in terms of extent of blurred focus; and on the basis of this evaluation value for the extent of blurred focus, in conjunction with the evaluation value based on quality of composition, to then designate the recommended image.

As a specific example, in Step S210 of Embodiment 1 or 3, an evaluation value based on the extent of blurred focus may be derived in addition to the evaluation value based on quality of composition; and then in the process of Step S226, the combined value of these evaluation values may be derived as the composite evaluation value for the images, and the recommended image designated on the basis of the composite evaluation value so derived. In this way as well, it is possible to designate images with less blurred focus and better composition as recommended images for printing.

Additionally, while in Embodiment 2, selection was carried out so as to exclude images with blurred focus from selection as recommended images, it is also possible, for example, to exclude images with improper exposure, i.e. overexposed or underexposed images, in addition to images with blurred focus, from selection as recommended images. In this case, in a manner analogous to the blurred focus determination process described above, an additional determination will be made as to whether images are improperly exposed, and if not improperly exposed, the recommended candidate image will be then designated as the recommended image. In this case, properly exposed images may be considered as those having high evaluation values in relation to exposure.

The evaluation value for selecting recommended images may be derived using some other evaluation items other than composition, blurred focus, or exposure. For example, an evaluation value relating to contrast within an image may be used as well. As will be understood from these examples, it is possible to use any value derived by analysis of images in relation to any one or more evaluation items as the evaluation value for selecting recommended images.

E2. Modified Example 2

In Embodiment 1 discussed previously, the process of determining similarity with the immediately preceding image and the process of deriving the evaluation value are both carried out based on image data of the original images or non-reduced images, whereas in Embodiment 2 both processes are carried out based on image data of thumbnail images; however, the invention is not limited to this. For example, it is acceptable to use image data of thumbnail images for the process of determining similarity, while executing the process of deriving the evaluation value using image data of the original images. By so doing it is possible to accelerate the process, as compared to the case where image data of the original images is used for both processes.

E3. Modified Example 3

In Embodiment 3 discussed previously, in the event that the number N of images belonging to the immediately preceding group is equal to or greater than the threshold value Na, the image currently selected for processing is assigned to a new group; however, it is possible to take a number Nb of images which belong to the immediately preceding group and which come later in shooting sequence, and to reassign these number Nb of images to the new group together with the image selected for processing rather than to the immediately preceding group. In preferred practice, the value of Nb will an integer between 1 and Na/2. In this case, by setting Na to 5 and Nb to 2 for example, as shown in FIG. 8, in the event that Image 8 is selected as the image for processing, and it has been determined that the number of images belonging to group "002" is "5" and equal to or greater than Na (=5), then for example of the Images 3-7 belonging to group "002," the two Images 6 and 7 coming later in the shooting sequence will be reassigned to the new group "003" together with Image 8.

In Embodiment 2, in the event that the number of similar images is six, which is equal to the threshold value Na+1, a group composed of a single image only will be created. As a result, even if this image has poor composition, since its evaluation value cannot be compared with that of another image, it will inevitably be selected as the recommended image. On the other hand, where Images 6 and 7 belong to the new group "003" together with Image 8, the recommended image will be selected from among these images, making it possible for an image of better composition to be selected as the recommended image.

The images taken from the immediately preceding group for inclusion in the new group together with the image selected for processing need not necessarily be a prescribed number starting from later in the shooting sequence; among images belonging to the immediately preceding group, it is acceptable to take other images belonging to the immediately preceding group, for example, a prescribed number starting from earlier in the shooting sequence.

E4. Modified Example 4

In Embodiments 1 to 3 discussed hereinabove, when determining whether an image selected for processing is similar to the immediately preceding image, the determination is made using the summed differentials of the histograms for all colors (R, G, B); however, it is possible instead to make the decision using the summed differentials of the histograms for any one or two colors. It is also possible to make similarity determinations without using summed differentials of color histograms. For example, it is possible to perform pattern matching of images with one another, and to determine similarity on the basis of the degree of matching. It is also possible to determine similarity where the interval between the shooting time of the image selected for processing and the shooting time of the immediately preceding image is less than a prescribed interval. This is because images shot within a short period of time are considered to be similar images. It is also possible to determine similarity by means of the color histogram differentials mentioned above, after having first determined similarity by means of shooting interval in this way.

E5. Modified Example 5

In Embodiments 1 to 3 hereinabove, once a recommended image has been designated, the compressed image data of the original image for the recommended image is read from the memory card MC, decompressed, and a print instruction issued; however, it is acceptable instead to perform correction of contrast and/or sharpness after decompression of the compressed image data of the original image, and to then issue the print instruction.

E6. Modified Example 6

In Embodiments 1 to 3 hereinabove, images are sorted into groups in order of shooting time; however, the invention is not limited to this. For example, it is acceptable instead to sort images by file name, and in that order compare them one at a time with all other images and calculate color histogram differentials, then group them based on the calculated color histogram differentials. Grouping may be carried out automatically in this manner as well.

E7. Modified Example 7

In Embodiments 1 to 3 hereinabove, each time that the recommended image is designated for a group, the designated recommended image is printed out; however, it is acceptable instead to print out the recommended images only after recommended images have been designated for all groups. In this way, grouping and selection of recommended images can be carried out very simply.

E8. Modified Example 8

In Embodiments 1 to 3 hereinabove, the recommended image printing process is carried out and recommended images are printed out for a plurality of images stored on the memory card MC; however, the invention is not limited to this. For example, it is acceptable instead to execute the recommended image printing process and print out recommended images for a plurality of images stored on a hard disk drive of a computer (not shown) connected via the external interface 33.

What is claimed is:

1. A printing device for selecting and printing a recommended image from among a plurality of images, comprising:
   an evaluation value determining module configured to determine, for each image, a first evaluation value for a prescribed evaluation item;
   a grouping process module configured to perform a sorting process to sort the plurality of images into groups of similar images;
   a recommended image designating module configured to designate, for each group, a recommended image from among the images belonging to the group, based on the first evaluation value; and
   a printing process module configured to print the designated recommended image.

2. The printing device of claim 1, wherein
   the plurality of image are sequenced in a temporal series, and
   the grouping process module executes the sorting process by dividing up the plurality of images at dividing positions in the temporal series.

3. The printing device of claim 2, wherein
   each time that a recommended image is designated for one group selected for processing, i) the recommended image designating module causes the printing process module to initiate a printing process of the recommended image, and ii) the recommended image designating module causes the grouping process module to execute the sorting process to determine the next group selected for processing, in parallel with printing of the recommended image by the printing process module.

4. The printing device of claim 2, wherein during execution of the sorting process, the grouping process module sequentially takes one image from the temporal series as a current image selected for determination, and determines whether the current image is similar to an immediately preceding image, and if a determination that the current image selected for determination is similar to the immediately preceding image, the grouping process module classifies the current image selected for determination into an immediately preceding group to which the immediately preceding image belongs, while if a determination that the current image selected for determination is not similar to the immediately preceding image, classifies the current image selected for determination into a new group different from the immediately preceding group.

5. The printing device of claim 4, wherein when attempting to sort the current image selected for determination into the immediately preceding group, the grouping process module derives a total number of images belonging to the immediately preceding group, and determines whether the total number of images is less than a number Na where Na is a prescribed integer equal to 2 or greater; and if the total number of images is less than Na, the grouping process module classifies the current image selected for determination into the immediately preceding group, while if the total number of images is equal to or greater than Na, the grouping process module classifies the current image selected for determination into the new group instead of the immediately preceding group.

6. The printing device of claim 5, wherein if the total number of images is equal to or greater than Na, the grouping process module moves a prescribed number of images from the immediately preceding group, together with the current image selected for determination, into the new group instead of the immediately preceding group.

7. The printing device of claim 1, wherein the plurality of images each include a non-reduced image and a thumbnail image corresponding to the non-reduced image, the grouping process module executes the sorting process using the thumbnail images, and the evaluation value determining module determines the first evaluation value using the non-reduced images.

8. The printing device of claim 1, wherein the plurality of images each include a non-reduced image and a thumbnail image corresponding to the non-reduced image, the grouping process module executes the sorting process using the thumbnail images, the evaluation value determining module determines the first evaluation value using the thumbnail images, and for the images belonging to each group, the recommended image designating module designates, based on the first evaluation value, a candidate recommended image as a candidate for the recommended image, and analyzes the non-reduced image of the candidate recommended image in order to determine a second evaluation value, and based on the second evaluation value determines whether to make the candidate recommended image the recommended image.

9. The printing device of claim 1, wherein the prescribed evaluation item includes at least one of a first item for evaluating composition of each image, and a second item for evaluating extent of blurred focus of each image.

10. A recommended image printing method for designating and printing a recommended image from among a plurality of images, comprising the steps of:

(a) determining, for each image, a first evaluation value for a prescribed evaluation item;

(b) executing a sorting process to sort the plurality of images into groups of similar images;

(c) for each group, designating a recommended image from among the images belonging to the group, based on the first evaluation value; and (d) printing the designated recommended image.

11. The printing method of claim 10, wherein the plurality of image are sequenced in a temporal series, and the sorting process is executed by dividing up the plurality of images at dividing positions in the temporal series.

12. The printing method of claim 11, wherein each time that a recommended image is designated for one group selected for processing, i) a printing process of the recommended image is initiated, and ii) the sorting process to determine the next group selected for processing is executed in parallel with printing of the recommended image.

13. The printing method of claim 11, wherein during execution of the sorting process, one image is sequentially taken from the temporal series as a current image selected for determination, and it is determines whether the current image is similar to an immediately preceding image, and if a determination that the current image selected for determination is similar to the immediately preceding image, the current image selected for determination is classified into an immediately preceding group to which the immediately preceding image belongs, while if a determination that the current image selected for determination is not similar to the immediately preceding image, the current image selected for determination is classified into a new group different from the immediately preceding group.

14. The printing method of claim 13, wherein when attempting to sort the current image selected for determination into the immediately preceding group, a total number of images belonging to the immediately preceding group is derived, and it is determined whether the total number of images is less than a number Na where Na is a prescribed integer equal to 2 or greater; and if the total number of images is less than Na, the current image selected for determination is classified into the immediately preceding group, while if the total number of images is equal to or greater than Na, the current image selected for determination is classified into the new group instead of the immediately preceding group.

15. The printing method of claim 14, wherein if the total number of images is equal to or greater than Na, a prescribed number of images are moved from the immediately preceding group, together with the current image selected for determination, into the new group instead of the immediately preceding group.

16. The printing method of claim 10, wherein the plurality of images each include a non-reduced image and a thumbnail image corresponding to the non-reduced image, the sorting process is executed using the thumbnail images, and the first evaluation value is determined using the non-reduced images.

17. The printing method of claim 10, wherein the plurality of images each include a non-reduced image and a thumbnail image corresponding to the non-reduced image, the sorting process is executed using the thumbnail images, the first evaluation value is determined using the thumbnail images, and for the images belonging to each group, a candidate recommended image is designated as a candidate for the recommended image based on the first evaluation value, and the non-reduced image of the candidate recommended image is analyzed in order to determine a second evaluation value, and based on the second evaluation value it is determined whether to make the candidate recommended image the recommended image.

18. The printing method of claim 10, wherein the prescribed evaluation item includes at least one of a first item for evaluating composition of each image, and a second item for evaluating extent of blurred focus of each image.

* * * * *